United States Patent [19]

Barker

[11] Patent Number: 4,697,668
[45] Date of Patent: Oct. 6, 1987

[54] ASPIRATING MUFFLER

[75] Inventor: Irvy T. Barker, Stoughton, Wis.

[73] Assignee: Nelson Industries Inc., Stoughton, Wis.

[21] Appl. No.: 818,782

[22] Filed: Jan. 13, 1986

[51] Int. Cl.$^4$ .............................................. F01N 1/14
[52] U.S. Cl. ..................................... 181/262; 181/255
[58] Field of Search ........................ 181/262, 259, 255

[56] References Cited

U.S. PATENT DOCUMENTS

| | | | |
|---|---|---|---|
| 3,419,892 | 12/1968 | Wagner et al. | 181/259 X |
| 4,142,606 | 3/1979 | Vanderzanden et al. | 181/262 X |
| 4,325,460 | 4/1982 | Hoppenstedt | 181/259 |
| 4,388,091 | 6/1983 | Khosropour | 55/337 |

Primary Examiner—Benjamin R. Fuller
Attorney, Agent, or Firm—Andrus, Sceales, Starke & Sawall

[57] ABSTRACT

An aspirating muffler having a simplified venturi construction. The muffler includes a body having an inlet pipe connected to the exhaust system of an engine and having an outlet pipe. The upstream end of the outlet pipe is rolled inwardly to provide the end with a reduced cross sectional area which defines a venturi. An aspirating tube which is connected to an air cleaner pre-cleaner for the engine communicates with the venturi and flow of exhaust gas through the venturi end of the outlet pipe creates an aspirating action to draw solid particles from the pre-cleaner and discharge the particles through the outlet pipe to the atmosphere.

9 Claims, 4 Drawing Figures

4,697,668

ASPIRATING MUFFLER

BACKGROUND OF THE INVENTION

Off-road equipment such as tractors, bulldozers, and other construction equipment, are frequently subjected to dusty conditions which can cause premature clogging of the air pre-cleaner for the engine. To aid in removing accumulations of dust and other solid particles from the pre-cleaner and thereby prevent premature clogging, aspirating mufflers have been utilized. With an aspirating muffler, the flow of exhaust gas through the muffler creates an aspirating action which acts through an aspirating tube to draw dust and other particles from the air cleaner and discharge the dust and particles through the muffler to the atmosphere.

In a common aspirating muffler, exhaust gas from the engine is introduced into the muffler body through an inlet pipe and is discharged from the body through a separate discharge pipe. A venturi is formed in the outlet pipe, and an aspirating tube, which is connected to the pre-cleaner, communicates with the venturi. With this arrangement, flow of exhaust gas through the venturi will create an aspirating action to draw dust and solid particles from the pre-cleaner and discharge the material to the atmosphere.

The venturi, as used in a conventional aspirating muffler, is normally a weldment composed of a converging cone and a diverging cone. The tooling required for forming the conical sections of the venturi is expensive as is the fabrication cost for welding the conical sections to form the venturi. Because of this, the venturi is a significant factor in the overall cost of the aspirating muffler.

SUMMARY OF THE INVENTION

The invention is directed to an aspirating muffler, and more particularily, to a simplified venturi construction. In accordance with the invention, the upstream end of the outlet pipe of the muffler is rolled inwardly to provide an end of reduced cross sectional area and form a venturi. The inner end of the aspirating tube, which is connected to the air cleaner for the engine, communicates with the rolled end or venturi. With this construction, the exhaust gas being discharged through the venturi will create an aspirating action or negative pressure differential to draw solid particles from the pre-cleaner and discharge the particles from the muffler with the exhaust gas.

The rolled end of the outlet pipe provides an effective venturi action with a minimum restriction to the flow of exhaust gas.

The venturi construction of the invention is of simple construction in which the venturi and the outlet pipe can be formed as a single integral part, thereby substantially reducing the tooling and fabrication costs as compared to a conventional venturi formed of converging and diverging cones.

As an alternate construction, instead of forming the rolled or curled end integrally with the outlet pipe, a separate tubular insert having an inwardly rolled end can be is secured to the upstream end of the outlet pipe.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
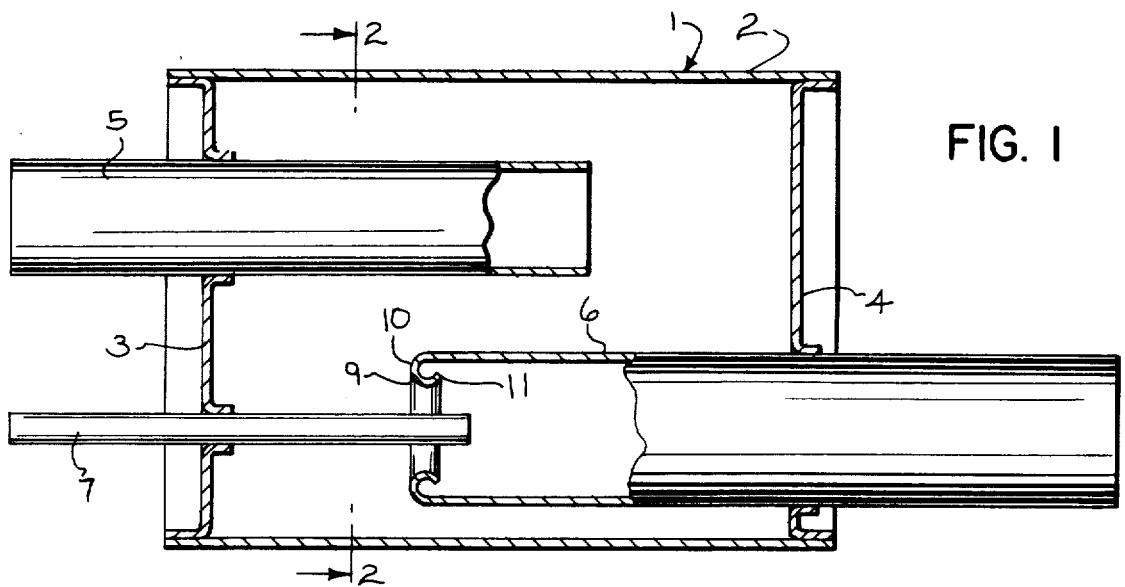
FIG. 1 is a longitudinal section of a typical aspirating muffler incorporating the venturi construction of the invention.

FIG. 1 shows a typical aspirating muffler 1 composed of a cylindrical or oval body 2 having opposite ends enclosed by flanges or heads 3 and 4, respectively. An inlet pipe 5 is secured within an opening in end flange 3 and is connected to the exhaust system of an engine, while an outlet pipe 6 is mounted within an opening in end flange 4 and is adapted to discharge exhaust gas from body 2 to the atmosphere.

An aspirating tube 7 having a smaller diameter than inlet pipe 5 is mounted within an opening in end flange 3 and the inner end of the aspirating tube is located concentrically within the upstream end of outlet pipe 6. The opposite end of aspirating tube 7 is connected to the outlet of a pre-cleaner for the air cleaner. The pre-cleaner is of conventional construction and in itself forms no part of the invention.

In accordance with the invention, the inner or upstream end of outlet pipe 6 is rolled or curled inwardly, as indicated by 9, and the extremities 10 and 11 of the rolled end 9 are smoothly curved. Rolled end 9 has a smaller cross sectional area than outlet pipe 6 and thus constitutes a venturi, and the inner end of aspirating tube 7 is spaced concentrically within the venturi. As the exhaust gas is discharged through the reduced cross sectional area of the venturi an increase in velocity and decrease in pressure will result which creates an aspirating action in tube 7 to draw dust and other solid material from the pre-cleaner 8 for discharge through outlet pipe 6. The smoothly curved extremities 10 and 11 promote laminar flow to increase the effectiveness of the aspirating action.

Figure 3:
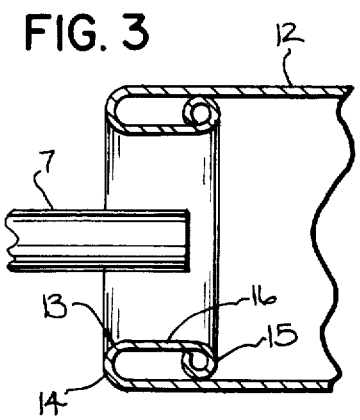
FIG. 3 is a fragmentary longitudinal section of a modified form of the venturi construction.

FIG. 3 illustrates a modified form of the invention in which the inner end of outlet tube 12, corresponding to outlet pipe 6 of the first embodiment, is rolled inwardly to provide an elongated rolled end 13 that defines a venturi. The rolled end 13 is a composed of an upstream end portion 14, a downstream end portion 15, and a generally cylindrical intermediate portion 16 that connects the end portions. The upstream and downstream extremeties 14 and 15, respectively, of the rolled end portion 13 are smoothly curved to provide a smooth transition for the gas passing through the venturi and to thereby minimize turbulence and increase the efficiency of the aspirating action.

Figure 4:
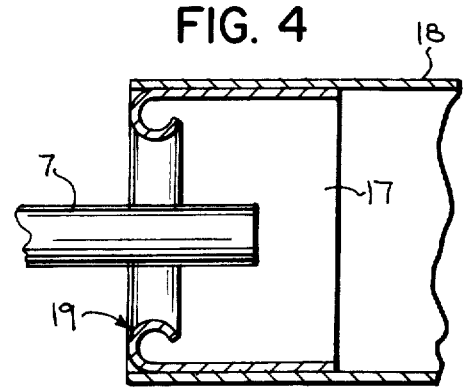
FIG. 4 is a second modified form of the venturi construction.

FIG. 4 shows a second modified form of the invention in which a tubular insert 17 is welded or otherwise secured within the upstream end of outlet pipe 18, which corresponds to outlet pipe 6 of the first embodiment. The upstream end of the insert is provided with an inwardly rolled or curled end 19, similar to end 9 as shown in the first embodiment. The inwardly rolled end 19, as previously described, is spaced concentrically outward of the aspirating tube 7 and defines a venturi so that exhaust gas flowing through the venturi will create an aspirating action to draw air and foreign material through the aspirating tube 7 for discharge from the outlet pipe 18.

The construction of the invention provides a simple and effective venturi with minimum pressure drop or restriction to the flow of exhaust gas through the outlet pipe.

Figure 2:
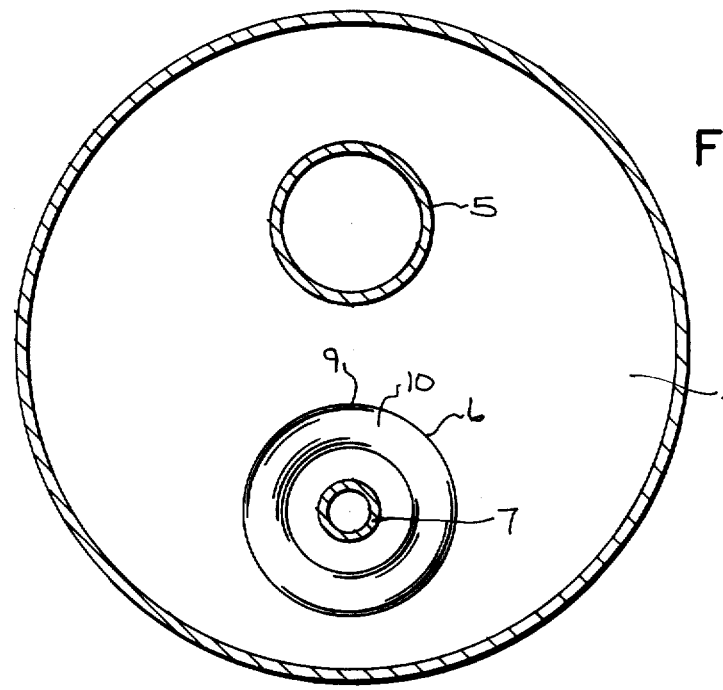
FIG. 2 is a section taken along line 2—2 of FIG. 1.

As illustrated in FIGS. 1-3, the venturi can be formed as an integral part of the outlet pipe to substantially reduce tooling and fabrication costs.

While the above description has shown the venturi construction of the invention as associated with the outlet pipe of the muffler, it is contemplated that the venturi can be associated with any tubular member in the exhaust system. Similarily, the particular configuration of the muffler, and the location of the inlet and outlet pipes, as well as the aspiration tube, is not critical to the invention.

Various modes of carrying out the invention are contemplated as being within the scope of the following claims particularly pointing out and distinctly claiming the subject matter which is regarded as the invention.

I claim:

1. In an exhaust system for an engine, a body having exhaust gas inlet means and outlet means, a tubular member mounted within said body and disposed to conduct exhaust gas, said tubular member having an integral inwardly rolled portion to provide said portion with a reduced cross sectional area, and an aspirating tube spaced concentrically within said rolled portion, and having an upstream end communicating with the exterior of said body, exhaust gas passing through said rolled portion creating an aspirating action to draw air through said aspirating tube.

2. The exhaust system of claim 1, wherein said rolled portion has a smoothly curved downstream extremity and a smoothly curved upstream extremity.

3. The exhaust system of claim 2, wherein said rolled portion has a generally cylindrical intermediate section extending between said downstream and upstream extremities.

4. In an exhaust system, a body having exhaust gas inlet means and outlet means, conduit means disposed within said body and communicating with said inlet means for conducting said exhaust gas, an end portion of said conduit means being rolled inwardly in a downstream direction to provide said end portion with a reduced cross sectional area and define a venturi, the upstream and downstream extremities of said rolled end portion being smoothly curved, and an aspirating tube spaced concentrically within said conduit means, said aspirating tube having an upstream end communicating with the exterior of said body and a downstream end disposed adjacent said venturi, whereby flow of gas through said venturi creates an aspirating action to draw air through said aspirating tube.

5. The exhaust system of claim 4, wherein said conduit comprises a first tubular member, and a second tubular member secured to an end of said first member, said rolled end portion being formed on said second tubular member.

6. The exhaust system of claim 4, wherein said rolled end portion also includes a generally cylindrical central section extending between said upstream and downstream extremities.

7. An aspirating muffler, comprising a body, an inlet pipe to introduce exhaust gas to said body, an outlet pipe in said body for discharging exhaust gas from said body, said outlet pipe having an inner end portion disposed within said body, the inner end of said outlet pipe being rolled inwardly to provide said end with a reduced cross sectional area and define a venturi, said inwardly rolled end having smoothly curved upstream and downstream extremities, and an aspirating tube spaced concentrically within said venturi, flow of exhaust gas through said venturi creating an aspirating action to draw air through the aspirating tube.

8. The muffler of claim 7, wherein said inlet pipe and outlet pipe are parallel and offset laterally of each other.

9. The muffler of claim 7, wherein said aspirating tube has one end connected to a pre-cleaner for an engine and the opposite end is mounted concentrically within said venturi.

* * * * *

UNITED STATES PATENT AND TRADEMARK OFFICE
CERTIFICATE OF CORRECTION

PATENT NO. : 4,697,668

DATED : October 6, 1987

INVENTOR(S) : IRVY T. BARKER

It is certified that error appears in the above-identified patent and that said Letters Patent is hereby corrected as shown below:

Col. 4, line 17, CLAIM 5, After "conduit" insert ---means---

Signed and Sealed this

Twenty-first Day of June, 1988

Attest:

DONALD J. QUIGG

*Attesting Officer*   *Commissioner of Patents and Trademarks*